United States Patent [19]

Skarvada

[11] 4,338,669
[45] Jul. 6, 1982

[54] MODULATOR FOR ANTI-SKID BRAKING SYSTEM

[75] Inventor: Thomas Skarvada, Woodland Hills, Calif.

[73] Assignee: Crane Co., Chicago, Ill.

[21] Appl. No.: 147,386

[22] Filed: May 7, 1980

[51] Int. Cl.³ .................. B60T 8/00; G06F 15/20
[52] U.S. Cl. ................... 364/426; 303/95; 303/109
[58] Field of Search ............ 364/426; 303/95, 97, 303/103, 106, 107, 109

[56] References Cited

U.S. PATENT DOCUMENTS

| 3,523,712 | 8/1970 | Leiber | 303/97 |
|---|---|---|---|
| 3,724,916 | 4/1973 | Hirzel | 303/109 |
| 3,727,992 | 4/1973 | Bowler et al. | 303/107 |
| 3,838,890 | 10/1974 | Wind | 303/107 |
| 3,889,128 | 6/1975 | Luhdorff | 303/97 X |
| 3,951,466 | 4/1976 | Guagliumi et al. | 303/97 |
| 3,964,796 | 6/1976 | Bremer | 303/107 |
| 4,076,332 | 2/1978 | Taylor et al. | 303/107 X |

Primary Examiner—Jerry Smith
Attorney, Agent, or Firm—Hume, Clement, Brinks, Willian & Olds, Ltd.

[57] ABSTRACT

An improved modulator for an anti-skid brake control system generates a modulated brake control signal as a time integral function of the difference between an input signal indicative of a braking condition and a variable threshold signal. The preferred embodiment includes a computer which stores a number of threshold signals. An appropriate one of these threshold signals is selected depending on the magnitude of the velocity of the braked wheel.

18 Claims, 6 Drawing Figures

MODULATOR FOR ANTI-SKID BRAKING SYSTEM

BACKGROUND OF THE INVENTION

This invention relates to an improved modulator for an anti-skid braking system.

One important class of modern anti-skid systems utilizes a modulator to provide a smoothly varying, continuous brake control signal. An early example of such systems is disclosed in U.S. Pat. No. 3,724,916, issued Apr. 3, 1973 to Edgar A. Hirzel and assigned to the assignee of the present invention. Such anti-skid systems have achieved a high level of commercial success, particularly for use with large jet transports such as the Boeing 727, 737 and 747 aircraft.

The modulators in these anti-skid systems generate a modulated brake control signal as a time integral function of an input signal indicating a braking condition. In one type of modulator, the input signal is an error signal corresponding to the difference between measured wheel velocity and a reference velocity. This error signal is related to the slip velocity of the braked wheel and the pavement. In another type of modulator, the input signal corresponds to measured wheel deceleration. In either case, the modulated brake control signal varies smoothly and continuously as a time integral function of the input signal.

In the past, such modulators have failed to provide an optimal level of flexibility and certain compromises have been necessary to design a modulator which provided the highest level of braking efficiency.

SUMMARY OF THE INVENTION

The present invention is directed to an improved modulator which provides increased flexibility and braking efficiency.

According to this invention, a modulator is provided with means for generating a threshold signal as a function of the velocity of the braked wheel. A rate signal is then generated as a function of both the threshold signal and the input signal discussed above, and a modulated brake control signal is generated as a time integral function of the rate signal.

An important advantage of this invention is that it allows the modulator to be adjusted for optimally aggressive braking as a function of wheel velocity. The threshold value affects braking aggressiveness: a higher threshold value allows more aggressive braking before the modulator relaxes braking effort. Thus, by providing a variable threshold which is generated as a function of wheel speed, the present invention allows the threshold to be tailored to a particular aircraft-brake-landing gear combination as a function of wheel speed. Modulator efficiency is therefore more readily optimized at one speed regardless of the threshold requirements needed to optimize performance at another speed.

The invention itself, together with further objects and attendant advantages, will best be understood by reference to the following detailed description taken in connection with the accompanying drawings.

DETAILED DESCRIPTION OF A PREFERRED EMBODIMENT

Figure 1:
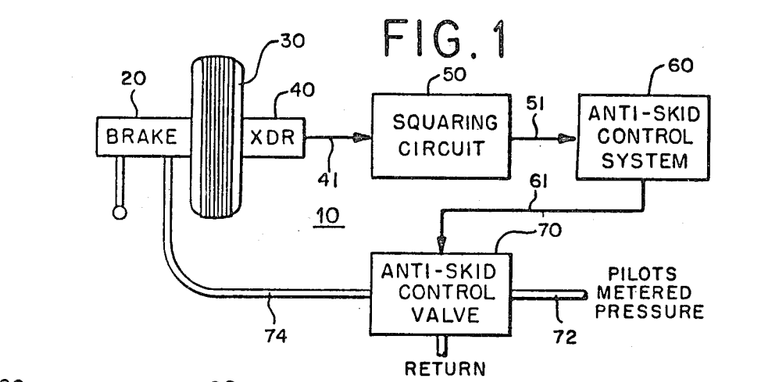
FIG. 1 is a block diagram of a brake control system including an anti-skid control system.

Referring now to the drawings, a preferred embodiment of the improved modulator of the present invention will be described in connection with the brake control system shown in FIGS. 1 and 2. FIG. 1 shows the major components of an anti-skid brake control system 10 which provides brake control for the brake 20 of the rotatable wheel 30. The system 10 includes a wheel speed transducer 40 which provides a sinusoidal signal on the line 41 having a frequency proportional to the angular velocity of the wheel 30. The signal on line 41 is shaped in a squaring circuit 50 and is then supplied as a wheel speed signal to an anti-skid control system 60 via line 51. The anti-skid control system 60 monitors the wheel signal on line 51. When the wheel signal indicates that the wheel 30 is about to go into a skid due to excessive braking force, the anti-skid system 60 generates a brake control signal on line 61. The anti-skid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure on the line 72 is passed by the valve 70 via the line 74 to the brake 20. However, if the metered brake pressure exceeds the skid threshold and drives the wheel 30 into a skid, the anti-skid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

Figure 2:
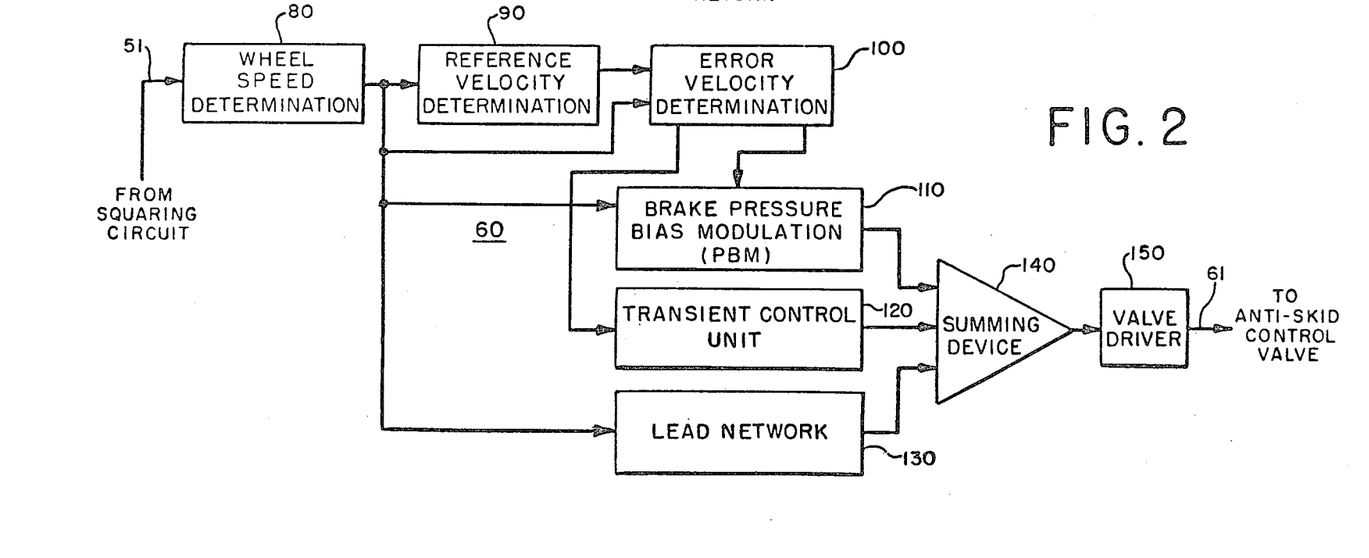
FIG. 2 is a detailed block diagram of the functional components of the anti-skid control system of FIG. 1.

FIG. 2 shows a schematic representation of the anti-skid system 60 of FIG. 1, including a wheel speed determination unit 80 which receives the wheel signal on line 51 as an input and generates an output signal representative of measured wheel speed. This wheel speed signal is supplied as an input to a reference velocity determination unit 90 for generating a reference velocity signal. This reference velocity signal is supplied as an input to an apparatus 100 for determining an error velocity signal representative of the difference between the measured wheel speed signal and the reference velocity signal. The error velocity signal is applied as an input to two separate control units: the brake pressure bias modulation (PBM) unit, or modulator 110, and the transient control unit 120. The modulator 110 is described in detail below in connection with FIGS. 3–6 and Tables 1–4. Here it is enough to state that the modulator 110 generates a modulated brake control signal representative of the optimum braking pressure. The signal is smoothly, continuously modulated either to increase or to decrease the applied brake pressure to substantially prevent excessive wheel skidding while maintaining a high, effective level of braking.

Because the output of the modulator 110 varies smoothly and continuously with time, it will on occasion be unable to respond quickly enough to prevent a wheel skid. For example, when a braked wheel suddenly enters a tar strip or an ice patch or a wet surface, the braking coefficient will abruptly fall and the modulator 110 may be unable to prevent a deep skid if the wheel 30 is heavily braked. Under these conditions, the transient control unit 120 responds to a large error velocity signal by commanding a sharp and sudden reduction in applied brake pressure.

The wheel speed signal is also applied as an input to a lead network 130 which responds to changes in the wheel speed signal to anticipate trends and to command an early modification in brake pressure to anticipate skids.

Outputs from the modulator 110, the transient control unit 120, and the lead network 130 are summed in a summing device 140 to produce a brake control signal which is amplified by the valve driver 150 and then applied as a control signal via line 61 to the antiskid control valve 70.

The foregoing description of the brake control system 10 is provided to set forth the environment of a preferred embodiment of the modulator of this invention. With the exception of the modulator 110, individual components of this environment do not form a part of the present invention, and for that reason will not be described in detail here. Furthermore, those skilled in the art are familiar with various forms of these components. For example, one form of the wheel speed determination unit 80, the error velocity determination unit 100, the modulator 110, and the transient control unit 120 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; in U.S. Pat. No. 4,125,295, issued Nov. 14, 1978 to Gerhard Ruhnam, et al.; and in U.S. Pat. No. 4,184,203, issued Jan. 15, 1980 to the inventor of the present invention.

The present invention is directed to an improved modulator for a brake control system. The presently preferred embodiment of this invention, included in modulator 110 of FIG. 2, will be described in conjunction with the flow charts of FIGS. 3 and 4 and the graphs of FIGS. 5 and 6. The presently preferred embodiment of this invention is implemented as a programmed microprocessor. The presently preferred microprocessor is a Z-80 CPU manufactured by Zilog, Inc., Cupertino, Calif. The program is presented in flow chart form in FIGS. 3 and 4 and is listed in assembly language form in Tables 1-4.

Figure 3:
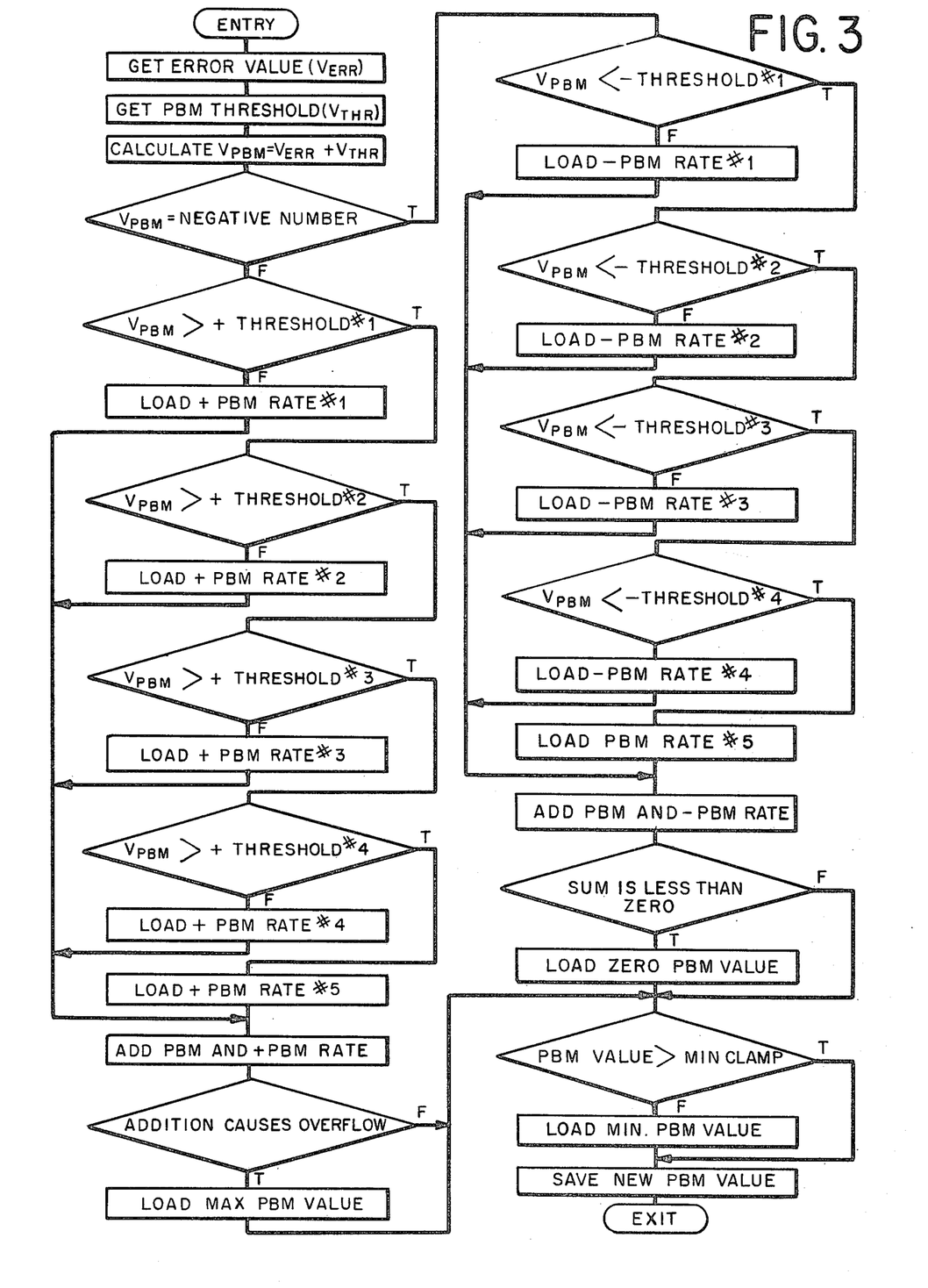
FIG. 3 is a flowchart of a portion of the brake pressure bias modulation (PBM) determination unit of FIG. 2.
Figure 4:
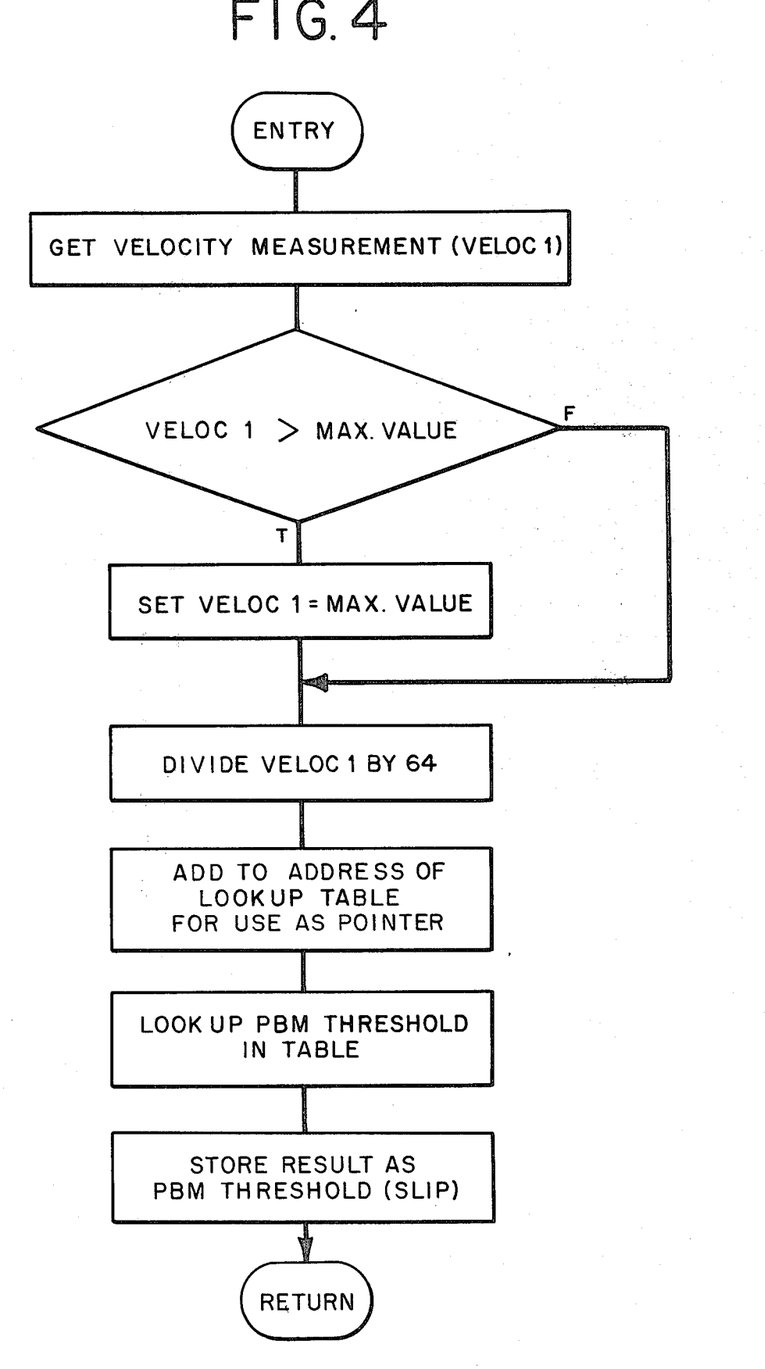
FIG. 4 is a flowchart of a second portion of the PBM determination unit of FIG. 2.

This program is executed periodically (203 times each second in the preferred embodiment) to generate a modulated brake control signal. This modulated brake control signal is then added to signals produced by the transient control unit 120 and the lead network 130, and the resulting signal is used to control the valve driver 150.

As mentioned earlier, the improved modulator of this invention can be used with a wide variety of brake control systems. This preferred embodiment utilizes two dynamic variables generated by the remainder of the brake control system.

First, this preferred embodiment accepts as an input the most recent measurement of wheel velocity, which is labelled VELOC1 in the listings. In this embodiment, VELOC1 is updated 203 times per second by the wheel speed determination unit 80.

Second, this embodiment accepts as an input the error velocity signal generated by the error velocity determination unit 100. This signal is labelled ERROR in the listings and $V_{ERR}$ in the flowcharts. Here, ERROR corresponds generally to the algebraic difference between the reference velocity, as determined by the reference velocity determination unit 90, and the instantaneous wheel speed, as determined by the wheel speed determination unit 80. Thus, ERROR provides an indication of the slip velocity of the braked wheel 30.

As a preliminary matter, it should be noted that the modulator of this invention produces a modulated control signal which corresponds generally to the average level of brake pressure applied to the brake 20.

Thus, a high modulator output corresponds to a high coeffecient of friction between the wheel 30 and the pavement. In practice the anti-skid valve 70 is generally designed to require a large current to bring about a large reduction in brake pressure, and therefore the driver 150 is designed to invert the signal from the summing device 140 prior to amplification to obtain the desired relationship between the modulated control signal and the valve control signal.

Turning now to FIG. 3, the preferred embodiment of the improved modulator of this invention accepts as an input the error velocity signal ERROR and the wheel velocity signal VELOC1 as described above, and generates a modulated brake control signal in response to these two dynamic variables. As shown in FIG. 3, the first step in the program is to obtain the current error velocity. The VELOC1 velocity is used in the program flow charted in FIG. 4 to obtain the instantaneous threshold signal. As shown in FIG. 4, this is done by first obtaining the most recent wheel speed velocity measurement (VELOC1) and clamping VELOC1 to a maximum velocity if it exceeds that maximum velocity. Then the clamped VELOC1 is divided by 64 and the resulting value added to the beginning address of a look-up table. This look-up table is listed in Table 3, and it contains a plurality of threshold values. Depending on the instantaneous value of the pointer obtained from VELOC1, one of this plurality of threshold values is selected as the instantaneous threshold signal and stored in the variable SLIP.

Returning to FIG. 3, the program then adds the error velocity signal to the threshold signal and branches according to the sign and magnitude of the resulting sum. If the resulting sum is positive the program then selects one of five positive rate values in accordance with the size of the summation value. The selected rate is then added to the modulated control signal and the resulting sum is checked for overflow. If overflow has occurred, the modulated brake control signal is set to a maximum value.

Figure 6:
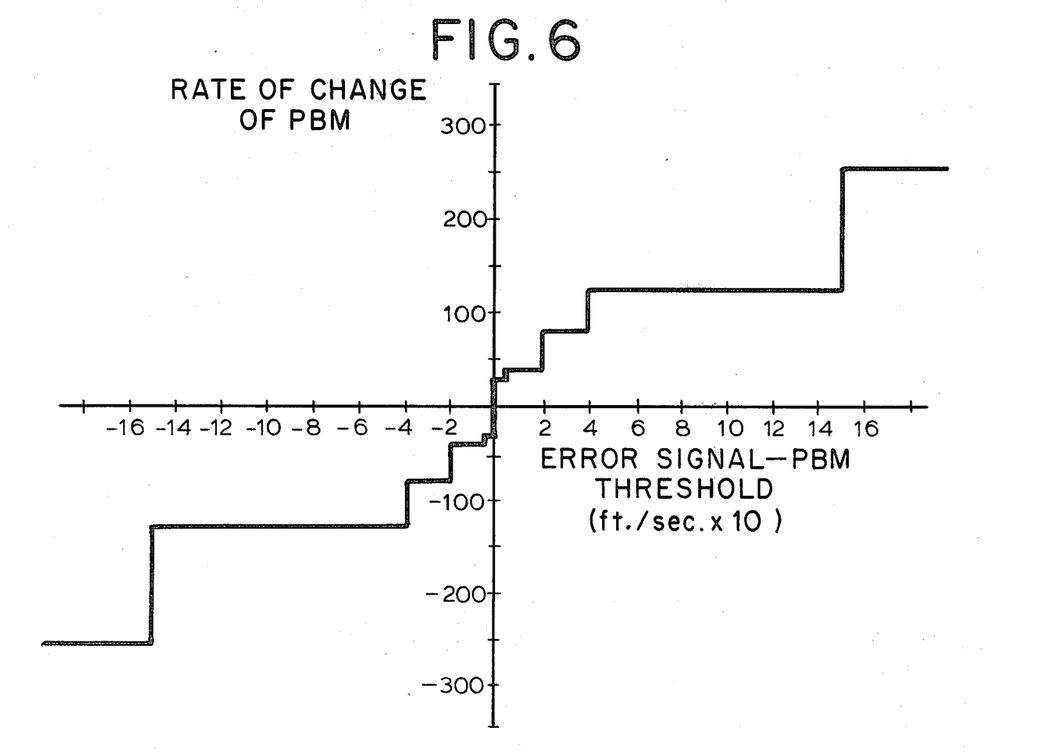
FIG. 6 is a graph showing the functional relationship between the PMB rate and the sum of the error signal and the threshold signal in the preferred embodiment of FIG. 2.

If, on the other hand, the sum of the error velocity signal and the threshold signal is negative, the resulting sum is compared with negative thresholds corresponding in magnitude to the four positive threshold values discussed above. Depending on the negative magnitude of the sum, one of five possible negative rate signals is chosen and the negative rate signal is then added to the modulated brake control signal, as shown in FIG. 6. Again, the resulting sum is checked for overflow and set to zero if overflow is sensed. Finally, the modulated brake control signal is clamped to a minimum value and the clamped result is saved as the new modulated brake control signal.

FIG. 6 presents in graphical form the information of Tables 1-4 relating to the non-linear function used to generate the rate signal. In FIG. 6, the x-axis is used to designate the difference between the error signal and the modulator threshold. This difference is in effect the input signal into the rate signal generating means. The y-axis is used to designate the modulator rate signal generated in response to various input signals. As shown in FIG. 6, the rate signal is a non-linear function of the input signal. This non-linear function (1) provides a large discontinuity at the point where the input signal equals zero, (2) is symmetrical about the origin, and (3) provides a rate signal which is proportionally greater for small values of the input signal than for large values of the input signal.

Figure 5:
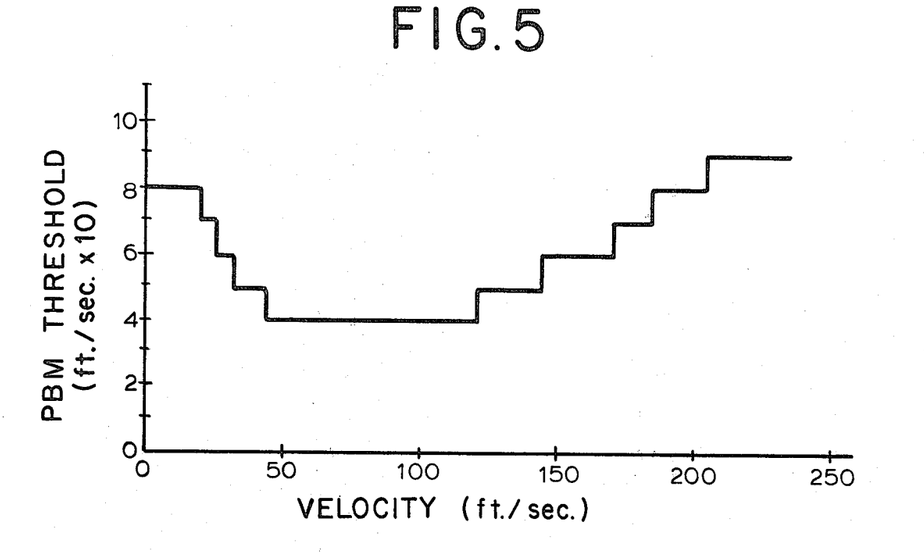
FIG. 5 is a graph showing the functional relationship between the PBM threshold and wheel velocity in the preferred embodiment of FIG. 2.

From the foregoing, it should be apparent that the disclosed program operates to generate a modulated brake control signal in response to an error velocity input signal and a wheel speed signal supplied by the remainder of the anti-skid system. One important feature of this preferred embodiment is that the threshold signal varies as a function of wheel velocity. The relationship between these two variables is graphically depicted in FIG. 5. In FIG. 5 it can be seen that a low threshold of four-tenths of a foot per second is used for wheel velocities in the range of about 50 to about 120 feet per second. For wheel velocities either higher or lower than this range higher threshold signals are used.

This variable threshold feature of the invention provides significant advantages in that the braking aggressiveness of the anti-skid system can be individually chosen for various wheel velocities. The curve of the FIG. 5 has been obtained through computer simulations. The approach used was to start with a uniformly low threshold signal and to raise the threshold signal in separate velocity ranges to the point where wheel skids became excessive in number. Preferably, ground force during a computer simulated braking run is evaluated as a function of wheel velocity. If ground force supplied by the braking system becomes lower than optimum and the skid activity is not excessive, then the threshold for that velocity region can be raised. In this way, the braking aggressiveness of the modulator can be tailored to individual conditions and the need to compromise braking efficiency at one speed to obtain improved braking efficiency at another speed is eliminated.

A second feature of this embodiment is that the velocity measurement VELOC1 is clamped to a maximum value before it is used as a pointer for table look-up purposes. This provides a fail safe feature in that a threshold value is obtained from the table even in the event of a malfunction causing the velocity measurement to read erroneously high. The table shown in Table 3 includes 37 distinct threshold values. In some applications it may be preferable to use a shorter table having half the resolution and approximately half the length of Table 3, thereby reducing memory requirements.

By way of explanation, Table 3 stores threshold values in units of tenths of feet per second. For example, the first entry in Table 3 reads BYTE 8. This indicates that the decimal number 8 is to be stored as the first entry in the table, and this entry corresponds to eight-tenths of a foot per second threshold velocity. The second column in the table reproduced in Table 3 indicates the range of velocities measured in feet per second which corresponds to the individual entries of the table. The variables VELOC1 and ERROR are sixteen bit variables scaled to one-tenth of a foot per second per least significant bit. Additionally, the variable PBM is directly related to brake pressure and inversely related to valve current. The relationship is linear such that full scale valve current corresponds to a PBM value of 1280 (hexadecimal) and zero valve current corresponds to a PBM value of 7FFF (hexadecimal).

Of course, it should be understood that various changes and modifications to the preferred embodiment described above will be apparent to those skilled in the art. For example, the invention can be used with acceleration based as well as velocity based modulators. In addition, the correspondence between wheel velocity and threshold, as well as other stored constants, can be chosen to fit other applications. The invention can be embodied in analog as well as digital forms; and other signals generally indicative of wheel speed, such as the reference velocity generated by the reference velocity determination unit 90, for example, can be used in place of the wheel speed signal to select the threshold signal. Such changes and modifications can be made without departing from the spirit and scope of the present invention, and without diminishing its attendant advantages. It is therefore intended that such changes and modifications be covered by the following claims.

TABLE 1

```
;       PBM FUNCTION
;       ***********************
;
PBMX    LD HL, (ERROR)
        LD D,0
        LD E, (IY+SLIP−RAM);
        PBM THRESHOLD VALUE
        ADD HL,DE
        EX DE, HL
        BIT 7,D
        JR NZ,PBMA; JUMP IF NEG (REF VELOCITY)
        LD HL,PBMTHR1; POSITIVE THRESHOLD 1
        XOR A
        SBC HL,DE
        JR C,PBMB
        LD HL,PBMRTE1; POSITIVE RATE 1
        JR PBMC
PBMB    LD HL,PBMTHR2; THRESHOLD 2
        XOR A
        SBC HL,DE
        JR C,PBMD
        LD HL,PBMRT2; 2; RATE 2
        JR PBMC
PBMD    LD HL,PBMTHR3; THRESHOLD 3
        XOR A
        SBC HL,DE
        JR C,PBMI
        LD HL,PBMRTE3; RATE 3
        JR PBMC
PBMI    LD HL,PBMTHR4; THRESHOLD 4
        XOR A
        SBC HL,DE
        JR C,PBMJ
        LD HL,PBMRTE4; RATE 4
        JR PBMC
PBMJ    LD HL, PBMRTE5; THRESHOLD 5
PBMC    LD DE,(PBM)
        ADD HL,DE
        BIT 7,H; CHECK FOR OVERFLOW
        JR Z,PBME
        LD HL,7FFFH; CLAMP TO MAX
```

TABLE 1-continued

```
          JR PBME
PBMA      LD HL,-PBMTHR1; NEGATIVE THRESHOLD 1
          XOR A
          SBC HL,DE
          JR NC,PBMF
          LD HL,-PBMRTE1; NEGATIVE RATE 1
          JR PBMG
PBMF      LD HL,-PBMTHR2; THRESHOLD 2
          XOR A
          SBC HL,DE
          JR NC,PBMH
          LD HL,-PBMRTE2; RATE 2
          JR PBMG
PBMH      LD HL,-PBMTHR3
          XOR A
          SBC HL,DE
          JR NC,PBMK
          LD HL,-PBMRTE3
          JR PBMG
PBMK      LD HL,-PBMTHR4
          XOR A
          SBC HL,DE
          JR NC,PBML
          LD HL,-PBMRTE4
          JR PBMG
PBML      LD HL,-PBMRTE5
PBMG      LD DE,(PBM)
          ADD HL,DE
          BIT 7,H; CHECK FOR OVERFLOW
          JR Z,PBME
          LD HL,0; CLAMP TO MIN VALUE
PBME      EX DE,HL
          LD HL,MAXPBM; PBM CLAMP VALUE
          XOR A
          SBC HL,DE
          JR C,PBMM; VALUE GOOD, JUMP
          LD DE,MAXPBM
PBMM      LD (PBM),DE
          SRL D
          RR E
          SRL D
          RR E
          SRL D
          RR E
          LD B,D
          LD C,E; SAVE SUM IN "BC"
;
```

TABLE 2

```
;
;         13. PBM THRESHOLD GENERATION
;*********************************************
;
          LD HL,(VELOC1)
          LD A,H
          CP MAXVEL/256
          JR C,TORQA
          LD HL,MAXVEL
TORQA     SLA L
          RL H
          SLA L
          RL H; MULTIPLY BY 4
          LD L,H
          LD H,0; DIVIDE BY 256
          LD DE,TABLE2
          ADD HL,DE
          LD A,(HL)
          LD (SLIP),A; SAVE THRESHOLD VALUE
;
```

TABLE 3

```
;
;         VARIABLE PBM THRESHOLD LOOK UP TABLE
;*********************************************
;
          THRESHOLD   VELOCITY
;         (FT/SECX10) (FT/SEC)
```

TABLE 3-continued

```
TABLE2    BYTE 8; 0-6.3
          BYTE 8; 12.7
          BYTE 8; 19.1
          BYTE 7; 25.5
          BYTE 6; 31.9
          BYTE 5; 38.3
          BYTE 5; 44.7
          BYTE 4; 51.1
          BYTE 4; 57.5
          BYTE 4; 63.9
          BYTE 4; 70.3
          BYTE 4; 76.7
          BYTE 4; 83.1
          BYTE 4; 89.5
          BYTE 4; 95.4
          BYTE 4; 102.3
          BYTE 4; 108.7
          BYTE 4; 115.1
          BYTE 4; 121.5
          BYTE 5; 127.9
          BYTE 5; 134.3
          BYTE 5; 140.7
          BYTE 5; 147.1
          BYTE 6; 153.5
          BYTE 6; 159.9
          BYTE 6; 166.3
          BYTE 6; 172.7
          BYTE 7; 179.1
          BYTE 7; 185.5
          BYTE 8; 191.9
          BYTE 8; 198.3
          BYTE 9; 211.1
          BYTE 9; 217.5
          BYTE 9; 223.9
          BYTE 9; 230.3
          BYTE 9; 236.7
;
```

TABLE 4

```
;
;         ********
;         *      *
;         * RAM  *
;         *      *
;         ********
;
ERROR     EQU 815H; ERROR VALUE FOR CONTROL
                   (TWO BYTES)
PBM       EQU 80AH; PBM VALUE (TWO BYTES)
SLIP      EQU 819H; SLIP VELOCITY VALUE
                   (ONE BYTE)
VELOC1    EQU 820H; NEW VELOCITY
;

;         ****************************
;         *                          *
;         * GENERAL CONSTANTS        *
;         *                          *
;         ****************************
;
MAXVEL    EQU 2304; 230.4 FT/SEC VELOCITY CLAMP
                   FOR PBM THRESHOLD
MAXPBM    EQU 4736; MAX PBM CLAMP
                   (SET AT 55 MA-47 MA = 8 MA)5.5.8.
PBMTHR1   EQU 4; THRESHOLD 1 (.4 FT/SEC)
PBMTHR2   EQU 20; THRESHOLD 2 (2 FT/SEC)
PBMTHR3   EQU 40; THRESHOLD 3 (4 FT/SEC)
PBMTHR4   EQU 150; THRESHOLD 4 (15 FT/SEC)
;
PBMRTE1   EQU 32; RATE 1
PBMRTE2   EQU 40
PBMRTE3   EQU 80
PBMRTE4   EQU 128
PBMRTE5   EQU 256
;
```

I claim:

1. In an anti-skid braking system for modifying the action of a brake application means for a braked wheel of a vehicle, said system including means for utilizing information obtained from the rotation of said wheel to generate an input signal indicative of a braking condition; modulator means, responsive to the input signal, for generating a modulated brake control signal; means, included in the modulator means, for generating a rate signal as a function of both the input signal and a threshold signal; means, included in the modulator means, for generating the modulated brake control signal as a time integral function of the rate signal; and means, responsive to the modulated brake control signal, for modifying the action of the brake application means; the improvement comprising:

means, included in the modulator means, for generating the threshold signal as a function of a velocity signal generally indicative of the velocity of the braked wheel.

2. The invention of claim 1 wherein the input signal is an error signal indicative of slip velocity.

3. The invention of claim 1 wherein the means for generating the threshold signal is operative to generate the threshold signal at a first value in response to a first velocity; at a second value, lower than the first value, in response to a second velocity, greater than the first velocity; and at a third value, greater than the second value, in response to a third velocity greater than the second velocity.

4. The invention of claim 3 wherein the first velocity is about 20 feet per second, the second velocity is about 100 feet per second, and the third velocity is about 200 feet per second.

5. The invention of claim 1 wherein the means for generating the threshold signal includes means for generating the threshold signal as a substantially decreasing function of the velocity signal in a first range of velocities and means for generating the threshold signal as a substantially increasing function of the velocity signal in a second range of velocities, wherein the second range of velocities consists of velocities greater than the velocities in the first range of velocities.

6. The invention of claim 5 wherein the first range of velocities includes velocities in the range of about 0 feet per second to about 100 feet per second and the second range of velocities includes velocities in the range of about 100 feet per second to about 200 feet per second.

7. In an anti-skid braking system for modifying the action of a brake application means for a braked wheel of a vehicle; said system including means for generating a wheel signal indicative of rotational velocity of the braked wheel; means, responsive to the wheel signal, for generating an input signal indicative of a braking condition; modulator means, responsive to the input signal, for generating a modulated brake control signal; means, included in the modulator means, for generating a rate signal as a function of the sum of the input signal and a threshold signal; means, included in the modulator means, for generating the modulated brake control signal as a time integral function of the rate signal; and means, responsive to the modulated brake control signal, for modifying the action of the brake application means; the improvement comprising:

means, included in the modulator means and responsive to the wheel signal, for generating the threshold signal as a function of the wheel signal, wherein the function of the wheel signal is chosen to promote effective control of the action of the brake application means.

8. The invention of claim 7 wherein the input signal is an error signal indicative of slip velocity.

9. The invention of claim 7 wherein the means for generating the threshold signal is operative to generate the threshold signal at a first value in response to a first amplitude of the wheel signal; at a second value, less than the first value, in response to a second amplitude of the wheel signal, greater than the first amplitude; and at a third value, greater than the second value, in response to a third amplitude of the wheel signal, greater than the second amplitude.

10. The invention of claim 9 wherein the first amplitude corresponds to a wheel velocity of about 20 feet per second, the second amplitude corresponds to a wheel velocity of about 100 feet per second, and the third amplitude corresponds to a wheel velocity of about 200 feet per second.

11. The invention of claim 7 wherein the means for generating the threshold signal includes means for generating the threshold signal as a substantially decreasing function of the wheel signal in a first range of amplitudes of the wheel signal and means for generating the threshold signal as a substantially increasing function of the wheel signal in a second range of amplitudes of the wheel signal, wherein the second range of amplitudes corresponds to wheel velocities greater than the wheel velocities to which the first range of amplitudes correspond.

12. The invention of claim 11 wherein the first range of amplitudes of the wheel signal includes amplitudes corresponding to wheel velocities in the range of about 0 feet per second to about 100 feet per second and the second range of amplitudes of the wheel signal includes amplitudes corresponding to wheel velocities in the range of about 100 feet per second to about 200 feet per second.

13. In an anti-skid braking system for modifying the action of a brake application means for a braked wheel of a vehicle; said system including means for generating a wheel signal indicative of rotational velocity of the braked wheel; means, responsive to the wheel signal, for generating an input signal indicative of a braking condition; modulator means, responsive to the input signal, for generating a modulated brake control signal; means, included in the modulator means, for generating a rate signal as a function of an algebraic combination of a selected threshold signal and the input signal; means, included in the modulator means, for generating the modulated brake control signal as a time integral function of the rate signal; and means, responsive to the modulated brake control signal, for modifying the action of the brake application means; the improvement comprising:

a computer;

means, included in the computer, for storing a plurality of alternative threshold signals; and means, included in the computer, for selecting one of the plurality of alternative threshold signals in response to the amplitude of the wheel signal and for supplying the selected threshold signal to the rate generating means, said plurality of alternative threshold signals chosen such that the selected threshold signal is matched to the vehicle and braked wheel to promote effective control of the action of the brake application means.

14. The invention of claim 13 wherein the input signal is an error signal indicative of slip velocity.

15. The invention of claim 13 wherein the selecting means is operative to select a first threshold signal in response to a first amplitude of the wheel signal; a second threshold signal, less than the first threshold signal, in response to a second amplitude of the wheel signal, greater than the first amplitude; and a third threshold signal, greater than the second threshold signal, in response to a third amplitude of the wheel signal, greater than the second amplitude.

16. The invention of claim 15 wherein the first amplitude corresponds to a wheel velocity of about 20 feet per second, the second amplitude corresponds to a wheel velocity of about 100 feet per second, and the third amplitude corresponds to a wheel velocity of about 200 feet per second.

17. The invention of claim 13 wherein the magnitudes of the plurality of threshold signals are chosen such that the magnitude of the selected threshold signal decreases with increasing amplitude of the wheel signal for a first range of amplitudes of the wheel signal and the magnitude of the selected threshold signal increases with increasing amplitude of the wheel signal for a second range of amplitudes of the wheel signal, wherein the second range of amplitudes corresponds to wheel velocities greater than the velocities to which the first range of amplitudes correspond.

18. The invention of claim 17 wherein the first range of amplitudes of the wheel signal includes amplitudes corresponding to wheel velocities in the range of about 0 feet per second to about 100 feet per second and the second range of amplitudes of the wheel signal includes amplitudes corresponding to wheel velocities in the range of about 100 feet per second to about 200 feet per second.

* * * * *

UNITED STATES PATENT AND TRADEMARK OFFICE
CERTIFICATE OF CORRECTION

PATENT NO. : 4,338,669
DATED : July 6, 1982
INVENTOR(S) : Thomas Skarvada

It is certified that error appears in the above—identified patent and that said Letters Patent is hereby corrected as shown below:

Column 6, line 53 (Table 1), delete "T2;2;" and substitute therefor --TE2;--.

Column 8, line 58 (Table 4), delete "5.5.8." after --)--.

Signed and Sealed this

Eleventh Day of January 1983

[SEAL]

Attest:

GERALD J. MOSSINGHOFF

Attesting Officer

Commissioner of Patents and Trademarks